United States Patent

Eheim

[15] 3,635,594
[45] Jan. 18, 1972

[54] ELECTRIC MOTOR AND IMPELLER-TYPE PUMP ASSEMBLY

[72] Inventor: Gunther Eheim, Plochinger Str. 32, 7301 Deizisau, Germany

[22] Filed: Feb. 26, 1970

[21] Appl. No.: 14,557

[30] Foreign Application Priority Data

Oct. 17, 1969   Germany......................P 19 52 353.6

[52] U.S. Cl............................................417/420, 310/172
[51] Int. Cl..................F04b 17/00, F04b 35/04, H02k 17/10
[58] Field of Search..................417/420, 423, 360; 310/172

[56] References Cited

UNITED STATES PATENTS

| 2,897,763 | 8/1959 | Wright | 417/360 |
| 2,951,447 | 9/1960 | Casassa | 417/420 |
| 3,085,513 | 4/1963 | Zimmermann | 310/172 X |
| 3,198,125 | 8/1965 | Yuza et al. | 417/420 |

*Primary Examiner*—Robert M. Walker
*Attorney*—Flynn & Frishauf

[57] ABSTRACT

The drive motor for an impeller-type pump is retained in a housing, the motor having its shaft coaxial with the pump shaft. The housing is hollow and tubular and closed at the side remote from the pump housing, the motor housing having in the interior thereof motor holding and locating stubs, for example to retain resilient (rubber) bushings secured to projecting bolts from the motor, so that the motor can be axially inserted in its housing, and the pump assembly forming the cover for the tubular housing and retaining the bolts, and thus the motor in position. Motor and pump are preferably interconnected by means of a magnetic coupling, so that the pump chamber can be sealed from the motor housing. Electrical connections by means of pins and plugs avoid soldering of wires internally of the housing.

14 Claims, 3 Drawing Figures

Inventor
GÜNTHER EHEIM

ELECTRIC MOTOR AND IMPELLER-TYPE PUMP ASSEMBLY

The present invention relates to an electric motor and impeller-type pump assembly in which the motor is located in a totally enclosed housing, which is closed off by the pump housing itself.

Water circulation pumps, for example for aquariums, chemical apparatus, small fountains and like use small motors and impeller type pumps, which have to be constructed inexpensively while having a high degree of safety both from an electrical, as well as mechanical point of view. Specifically, the motor must be totally enclosed and located in a housing of insulating material. The entire arrangement must be so designed that it is aesthetically pleasing and still can be made and assembled at low cost.

It is an object of the present invention to provide a motor-pump combination assembly which can be manufactured inexpensively and requires a minimum of assembly steps.

Subject matter of the present invention:

Briefly, the motor housing is closed off by a coaxial pump housing. The motor housing is tubular, and is formed internally with locating and holding means to support the motor therein in such a manner that the motor can be inserted into the housing, which is then closed off by the pump assembly to provide a quickly assembled inexpensively made unit. The pump housing, as well as the motor housing can be made of plastics. Electrical connections preferably include plug and pin connections, forming wiping-type contacts as the motor is inserted. These connections are preferably carried on circuit plugs or boards.

The motor is preferably held in position by one or more bolts passing therethrough, the ends of which are secured in rubber bushings which, in turn, are held inside the motor housing on suitable stubs, depressions, or other locating arrangements, which can all be molded into the housing well, or the pump assembly forming the cover, respectively.

To assemble the motor and pump, the motor is slid into the housing, axially, from the pump side and then secured in position by engagement of the bolts, or the respective rubber bushings, with the locating depressions or stubs. The rubber bushings intermediate the motor and locating projections or depressions decrease transmission of vibration. The bolt preferably is fixedly connected to the motor and extends axially through the stator laminations of the motor. The motor itself, together with connection pins or plugs of its electrical wiring, can be assembled outside of the housing, then inserted, and fixed in position simultaneously while making an electrical connection and sealing the motor in its housing by securing the pump cover thereon.

The invention will be described by way of example with reference to the accompanying drawings, wherein.

Figure 1:
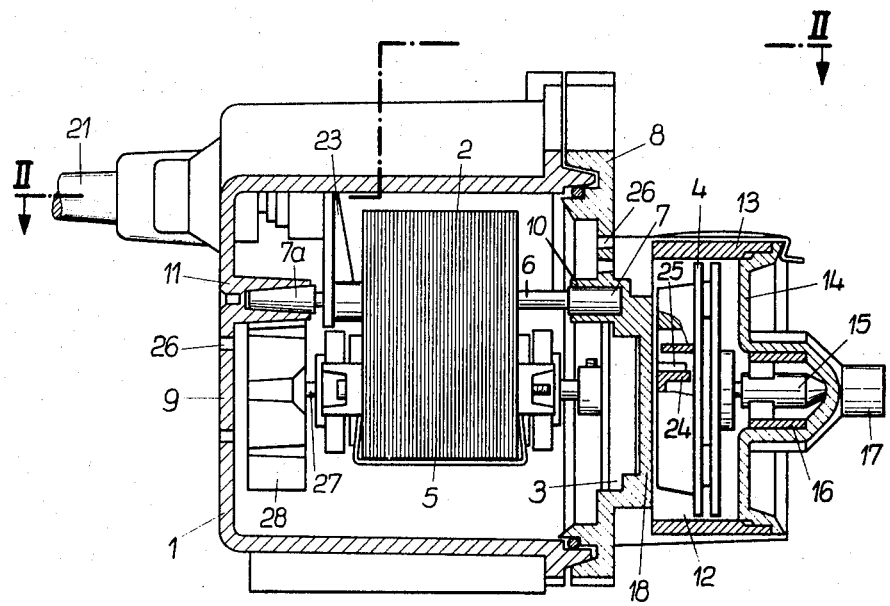
FIG. 1 is a longitudinal axial cross-sectional view along lines 1—1 of FIG. 2.

A motor housing 1 made of plastic material has an electric motor 2 secured therein, which drives a pump impeller 4 by means of a magnetic coupling 3. The stator laminations 5 have a pair of cylindrical bolts 6 passing therethrough which are fixed to the stator laminations, and may themselves connect the laminations together, for example by push-on toothed washers, nuts, or the like (not shown). Bolts 6, which may be solid or hollow, have rubber or other elastic material bushings 7, 7a applied to their ends. Bushing 7a is conical, whereas bushing 7 is cylindrical. Housing 1 is closed off by a removable cover 8 which is secured to the housing by means of axially extending screws, not shown. Cover 8, and the opposite wall 9 of the housing have bearing portions 10, 11 respectively formed therein to receive the elastic bushings 7, 7a. The housing cover 8 is integrally formed with a pump housing 13 defining a pump chamber 12 within which pump impeller 4 may rotate.

The pump housing is closed off by a removable cover 14 which carries a bearing 15 for the pump shaft. Bearing 15 is located within a spider 16 which is removably placed within cover 14. An inlet stub 17 for fluid to be pumped is formed in the cover 14. The magnetic coupling 3 may be made in the form of a pair of ring magnets which are differentially magnetized in sectors. The portions of the magnetic coupling are located on opposite sides of a separating wall 18, separating the interior of the motor housing and of the pump chamber and located within the housing cover 8.

The wall 9 of the motor housing, that is the wall opposite the cover 8 is formed with a contact strip 20 which is connected to an electrical supply cable 21. A contact strip 22 is connected to the motor circuit. It is retained on a holder 23 likewise secured to bolt 6.

Assembly of the pump, both when the apparatus is newly made, as well as for later maintenance is particularly simple: The motor 2, with the fixed bolts, or holding pins 6 is slipped into its housing, the contact strip 22 engaging the contacts on contact strip 20. The rubber bushing 7a fits into the associated holder 11. Thereafter, cover 8 is applied to the pump housing, engaging rubber bushing 7 into the holder 10 and thus fixing motor 2 securely in position within its housing 1.

Bolts or pins 6 may be arranged on the motor in any desired and suitable manner, for example transverse to the motor shaft, and fixed at the interior of housing 1 to the tubular walls, Suitable rubber bushings, fitting into, or around matching holders within the housing provide for insulation from vibration. The entire motor, again, can be removed as a unit from the housing by merely lifting it out.

FIG. 1 illustrated the arrangement in which the cable 21 is secured to the wall opposite the pump chamber. Preferably, the cable is molded into the wall, and secured by means of a suitable strain connector. Alternatively, the cable can be connected at the pump side, for example in cover 8, and connecting strips or plugs can be arranged on the cover 8 to match similar contact pins or blades secured to the motor.

A thin separating wall 18 secures a bearing 24 in which the impeller 4 can turn. Preferably, the bearing 24 is removable within a small sleeve 25 secured to wall 18.

The motor housing may be entirely sealed or, if desired, may be formed with air slits 26 in the region of sidewall 9, in order to provide for interchange of cooling air and ventilation of the motor, a ventilator 28 secured to the motor shaft 27 providing for forced circulation.

Various changes and modifications to the construction may be made within the scope of the inventive concept; for example, a sleeve or coupling ring may be used to interconnect cover plate 8 to housing 1; or axially extending screws, clips or the like. The motor itself is preferably a shaded pole motor, shown schematically and well known in the art.

Figure 3:
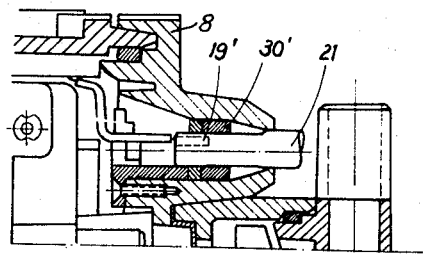
FIG. 3 is a fragmentary sectional view showing an alternative electrical connection arrangement.
Figure 2:
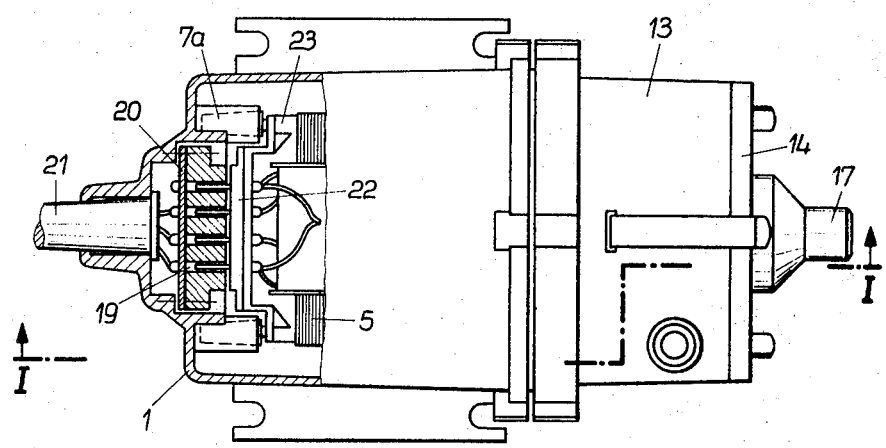
FIG. 2 is a top view of the pump of FIG. 1, sectioned along the line 2—2 of FIG. 1.

FIG. 3 shows the cable connection at the motor side; cable 21 is molded into cover 8 with a strain relief plug 30 and connected by a plug and pin connection 19' to the motor lead.

I claim:

1. Electric motor and impeller pump assembly comprising a pump housing;
   a motor housing aligned with said pump housing, said motor housing being cup-shaped, tubular and open at the side facing said pump housing and having tubular sidewalls and a bottom closing wall;
   an electric motor inserted in said motor housing;
   at least one elongated bolt secured to the motor and passing in axial direction through the motor;
   locating means integrally formed in the material of the housing to receive and removably locate said bolt in position in said housing to thus secure said motor in position in said housing;
   and a cover plate closing the open end of said housing and forming part of said pump housing.

2. Assembly according to claim 1, wherein the motor housing is made of moldable material, and the locating means are molded into the bottom closing wall and the cover plate.

3. Assembly according to claim 2, wherein the housing and the cover plate are made of plastic.

4. Assembly according to claim 3 wherein said motor housing and said cover plate are formed with means receiving said resilient plugs.

5. Assembly according to claim 3 wherein said resilient plugs are bushings of resilient material, at least one of said bushings being conical.

6. Assembly according to claim 1, wherein said bolt is a rigid cylindrical member extending through the stator laminations of the motor and firmly secured thereto.

7. Assembly according to claim 1 including separable, interengaging contact means secured to the end wall of said housing, and said motor, respectively;

the portion of the contact means being secured to the inner wall of the housing being connected to a supply cable.

8. Assembly according to claim 7 including a contact strip secured to said bolt said contact strip forming another portion of said separable contact means.

9. Assembly according to claim 1 including separable interengaging contact means secured to said cover plate and said motor, respectively;

and an electrical cable having a strain relieving connection secured to said cover plate and electrically connected to the portion of the contact means on said cover plate.

10. Assembly according to claim 1 wherein said pump housing and said motor housing are rigidly interconnected;

magnetic means (12) coupling the shafts of said motor and pump impeller;

and a thin separating wall separating the interior of the pump housing and the interior of the motor housing.

11. Assembly according to claim 10 wherein said pump housing is secured to said cover plate and said separating wall forms part of said cover plate.

12. Assembly according to claim 10 including a removable cover for said pump housing;

and means comprising a bearing for the pump impeller formed on said pump cover plate.

13. Assembly according to claim 10 including a pump impeller bearing carried by said separating wall.

14. Assembly according to claim 13 wherein said bearing comprises a bearing hub and a removable bearing liner.

* * * * *